US012715180B2

(12) United States Patent
Nielsen et al.

(10) Patent No.: US 12,715,180 B2
(45) Date of Patent: Aug. 25, 2026

(54) METHOD FOR MANUFACTURING A PREFORM BUILDING ELEMENT AND OVEN

(71) Applicant: Siemens Gamesa Renewable Energy A/S, Brande (DK)

(72) Inventors: Mogens Nielsen, Aalborg (DK); Enok Johannes Haahr Skjoelstrup, Aalborg Øst (DK); Samuel Robert van Oosterom, Hamilton (NZ)

(73) Assignee: Siemens Gamsea Renewable Energy A/S, Brande (DK)

( * ) Notice: Subject to any disclaimer, the term of this patent is extended or adjusted under 35 U.S.C. 154(b) by 0 days.

(21) Appl. No.: 18/688,444

(22) PCT Filed: Aug. 31, 2022

(86) PCT No.: PCT/EP2022/074244
§ 371 (c)(1),
(2) Date: Mar. 1, 2024

(87) PCT Pub. No.: WO2023/036671
PCT Pub. Date: Mar. 16, 2023

(65) Prior Publication Data

US 2024/0391185 A1 Nov. 28, 2024

(30) Foreign Application Priority Data

Sep. 10, 2021 (EP) .................................... 21196022

(51) Int. Cl.
*B29C 70/44* (2006.01)
*B32B 5/26* (2006.01)
(Continued)

(52) U.S. Cl.
CPC ................ *B29C 70/44* (2013.01); *B32B 5/26* (2013.01); *B32B 7/12* (2013.01); *F03D 1/0675* (2013.01);
(Continued)

(58) Field of Classification Search
CPC ... B29C 70/76; B29C 43/10; B29C 2033/023; B29C 70/44
See application file for complete search history.

(56) References Cited

U.S. PATENT DOCUMENTS 2,380,573 A * 7/1945 Beasecker .............. B27D 1/083 269/287
3,146,148 A * 8/1964 Mitchella ............... B21D 47/00 264/553
(Continued)

FOREIGN PATENT DOCUMENTS

CN 105936131 A 9/2016
CN 109153207 A 1/2019
(Continued)

OTHER PUBLICATIONS

PCT International Search Report & Written Opinion mailed Dec. 9, 2022 corresponding to PCT International Application No. PCT/EP2022/074244.

*Primary Examiner* — Matthew J Daniels
(74) *Attorney, Agent, or Firm* — Schmeiser Olsen PLLC

(57) ABSTRACT

A method for manufacturing a preform building element used for building a rotor blade of a wind turbine is provided. A plurality of components is arranged at least partly overlappingly in a component stack on a surface of a carrier, wherein the component stack includes a plurality of sections with overlapping components between which a binding agent is arranged, wherein the sections of the stack include at least partly a different thickness and/or different types of components, wherein the component stack is heated using a
(Continued)

heating source for activating the binding agent, wherein during the heating, at least one heat input reduction is used to reduce the heat input in the binding agent in at least one of the sections of the component stack for reducing binding agent migration during the activation.

5 Claims, 7 Drawing Sheets

(51) Int. Cl.
*B32B 7/12* (2006.01)
*F03D 1/06* (2006.01)
*B29L 31/08* (2006.01)

(52) U.S. Cl.
CPC ..... *B29L 2031/085* (2013.01); *B32B 2250/20* (2013.01); *B32B 2250/44* (2013.01); *B32B 2262/0269* (2013.01); *B32B 2262/101* (2013.01); *B32B 2262/106* (2013.01); *B32B 2603/00* (2013.01); *F05B 2220/30* (2013.01); *F05B 2230/20* (2013.01); *F05B 2240/30* (2013.01)

(56) References Cited

U.S. PATENT DOCUMENTS

| | | | | |
|---|---|---|---|---|
| 4,061,812 | A * | 12/1977 | Gilwee, Jr. | B29D 24/005 428/920 |
| 2002/0192327 | A1* | 12/2002 | Amnered | B29C 70/541 425/384 |
| 2005/0266113 | A1* | 12/2005 | Westerdahl | B29C 70/088 425/388 |
| 2010/0230575 | A1* | 9/2010 | Mironov | B29C 33/02 249/78 |
| 2012/0003597 | A1* | 1/2012 | Mason | B29C 35/02 432/225 |
| 2013/0233470 | A1* | 9/2013 | De Mattia | B32B 37/16 156/494 |
| 2016/0257427 | A1 | 9/2016 | Humfeld et al. | |
| 2017/0057028 | A1 | 3/2017 | Kellogg et al. | |
| 2017/0326632 | A1 | 11/2017 | Becker et al. | |
| 2020/0024956 | A1 | 1/2020 | Kray et al. | |
| 2023/0001626 | A1 | 1/2023 | Glässer et al. | |

FOREIGN PATENT DOCUMENTS

| | | | |
|---|---|---|---|
| CN | 110234497 | A | 9/2019 |
| CN | 107035425 | B | 12/2019 |
| CN | 107107282 | B | 11/2020 |
| DE | 102011076150 | A1 | 11/2012 |
| DE | 102019218775 | A1 | 6/2021 |
| EP | 1603723 | A1 | 12/2005 |
| EP | 2362824 | A1 | 9/2011 |
| EP | 2661357 | A1 | 11/2013 |
| EP | 2730397 | A1 | 5/2014 |
| EP | 2731772 | A1 | 5/2014 |
| EP | 2871047 | | 5/2015 |
| EP | 3018342 | A1 | 5/2016 |
| EP | 3102396 | A1 | 12/2016 |
| EP | 4067037 | A1 | 10/2022 |
| EP | 4067038 | A1 | 10/2022 |
| EP | 4079483 | A1 | 10/2022 |
| EP | 4088901 | A1 | 11/2022 |
| EP | 4091785 | A1 | 11/2022 |
| EP | 4091803 | A1 | 11/2022 |
| EP | 4116053 | A1 | 1/2023 |
| EP | 4137288 | A1 | 2/2023 |
| EP | 4147864 | A1 | 3/2023 |
| EP | 4155063 | A1 | 3/2023 |
| EP | 4183543 | A1 | 5/2023 |
| TW | 201318760 | A | 5/2013 |
| TW | 201718165 | A | 6/2017 |
| WO | 2004078443 | A1 | 9/2004 |
| WO | 2012092927 | A1 | 7/2012 |
| WO | 2013007351 | A1 | 1/2013 |
| WO | 2015113571 | A1 | 8/2015 |
| WO | 2019115337 | A1 | 6/2019 |
| WO | 2019115522 | A1 | 6/2019 |
| WO | 2019145240 | A1 | 8/2019 |

* cited by examiner 5, 6
16, 19
20
17
3
2
8

METHOD FOR MANUFACTURING A PREFORM BUILDING ELEMENT AND OVEN

CROSS-REFERENCE TO RELATED APPLICATIONS

This application claims priority to PCT Application No. PCT/EP2022/074244, having a filing date of Aug. 31, 2022, which claims priority to EP Application No. 21196022.4, having a filing date of Sep. 10, 2021, the entire contents both of which are hereby incorporated by reference.

FIELD OF TECHNOLOGY

The following relates to a method for manufacturing a preform building element used for building a rotor blade of a wind turbine, wherein a plurality of components is arranged at least partly overlappingly in a component stack on a surface of a carrier, wherein the stack comprises a plurality of sections with overlapping components between which a binding agent is arranged, wherein the sections of the stack comprise at least partly a different thickness and/or different types of components, wherein the component stack is heated using a heating means for activating the binding agent. Furthermore, the following relates to an oven adapted to heat preform building material arranged on at least one carrier surface for producing preform building elements used for building a rotor blade of a wind turbine.

BACKGROUND

Preform building elements, which are also called preforms, are textile sub-products used in composite manufacturing processes to decrease manufacturing cycle times. In liquid composite molding processes like resin transfer molding (RTM), in particular vacuum assisted resin infusion (VARTM), preform building elements may comprise a number of layers of a textile reinforcement material like glass fibers, carbon fibers and/or aramid fibers. The layers of the textile material are bonded together in order to form a semi-rigid structure from the textile layers to facilitate the laying-up of the textile material in the mold used for the resin injection to simplify and to shorten the preparation of the material prior to the resin infusion. Preform elements may consist of multiple components which are assembled within a preform casting mold, wherein the components may vary both in thickness and material composition, depending on the type of preform element to be manufactured.

When used in the context of composite wind turbine blade manufacturing, preform building elements are required to have significant variations in local layup, depending on which position in a wind turbine blade the preform building element will be integrated. For instance, areas near the root may require significantly more layers than areas towards the tip. Furthermore, preform building elements may have decreasing number of layers towards the edges, in particular for forming a tapered profile towards the edge, which may be used as a scarf joint to connect adjacently arranged preform elements.

Preforms can be formed by bonding textile layers together by a variety of methods including the usage of adhesives, stitching, tufting, breading, weaving, ultrasonic welding and/or by using solid or liquid binders. As binders, for instance a powdered thermoset or thermoplastic material may be used. The binder may be deposited, for instance evenly, upon the surface of the reinforcement textiles in a granular form and sintered in place for locally adhering the reinforcement textile layers for forming the preform building element.

The manufacturing of the preform building elements may comprise a heating phase and a subsequent cooling phase, when a binder is used. The component stack for forming the preform building element may be heated to a temperature at which the binder granules soften, and the viscosity decreases to a point at which the binder can flow. The binder granules then begin to flow around the fibers on the outer surface of adjacent textile layers, driven by a combination of compaction forces and capillary action.

When the binder has flown to sufficiently impregnate both surfaces of overlapping textile layers, the heating stops and the cooling phase begins. The temperature of the preform is then rapidly decreased until the viscosity of the binder has increased to a point at which it can no longer flow. Once cooled sufficiently, the binder granules that have impregnated adjacent layers now hold the textiles together via a combination of mechanical and chemical coupling. The layers of textile now form a preform element which can be lifted and handled as a single structure. In addition to textile components, rigid components for providing stiffening structures or the like may be used in a preform building element, depending on the intended position of the preform building element in the rotor blade to be manufactured. Also, the rigid components may be adhered to the textile layers using a binder.

The heating and cooling processes require careful design as there are limited time and temperature process windows in which sufficient bonding can be achieved. The binder must be held at an interdependent combination of temperature and heating time that allows for the binder to flow sufficiently into adjacent textile layers. If the binder is not heated to a high enough temperature, or heated for a too short period of time, respectively, then it will not sufficiently impregnate the surfaces of the components, in particular of the textile layers. If the binder is heated to a temperature that it is too high, or heated for too long, then it will be drawn into the textile layers by capillary action and away from the surfaces, resulting in poor interlaminar bonding between two or more overlapping components.

Textiles and core materials used in composite wind turbine blades typically have poor thermal conductivity. As a result of this, the outermost layers in a textile stack may reach thermal equilibrium with an applied heat source earlier than layers around the center point of the stack. This causes issues in the design of the preforming process for preform structures which have significant local variations in their number of textile layers and/or in the thickness of the component used. For example, surface layer and areas which have few layers may reach the temperature where binder begins to flow more rapidly, while layers in the center of the thickest part of the structure may require significantly more time. This may result in the preform having little adhesion between layers, for instance due to some sections having excessive binder migration while other sections have not had enough binder migration. An insufficient adhesion between the components of the preform building element makes it difficult to lift and handle the preform building element and therefore affects the usage of the preform element in the manufacturing of the rotor blade.

Additional difficulty in the process design may be caused by the required trade of between applied the temperature, preform layer adhesion, and cycle time. If a high temperature is applied to the outside of the preform, then a greater thermal gradient will result in less time being required for the center of the thickest area to reach the minimum temperature for the adhesion to occur and therefore resulting in a lower cycle time. The layers on the outer edges of the preform will have been above the temperature of binder flow for a shorter time, however, the higher temperature may result in the binder migrating away from the textile surface more rapidly. Conversely, if a low temperature is applied to the outside of the preform, then the lower thermic gradient results in more time being required for the center of the thickest area to reach the minimum temperature for adhesion to occur. However, this results in undesirable long cycle times. The layers on the outer edges of the preform to be manufactured will have been above the temperature of binder flow for a longer time. However, due to the lower temperature, the binder migration away from the textile surface is slower during this time.

SUMMARY

An aspect relates to an improved method for manufacturing a preform building element, which in particular reduces binder migration locally and therefore improves the adherence between the components forming the preform building element to be manufactured.

According to embodiments of the invention, this problem is solved by a method as initially described, wherein during the heating, at least one heat input reduction means or heat input reduction is used to reduce the heat input in the binding agent in at least one of the sections of the stack for reducing binding agent migration during the activation.

The plurality of components, from which the preform building element is manufactured, may be textile components like glass fiber, carbon fiber and/or aramid fiber layers. In addition, rigid components like core elements, for instance made from balsawood or a polymer material, may be used. The components are arranged on a surface of the carrier in a component stack. The component stack comprises a plurality of components, which are arranged above each other, at which are at least partly overlapping. In addition, also one or more components may be arranged juxtaposed on the surface of the carrier and/or as a layer of the stack, respectively. The components are at least partly overlapping, wherein in particular in between the overlapping components, a binding agent, in particular a thermoset or thermoplastic binder, is arranged to allow for an adherence of the overlapping components. The binder may be provided for instance as a powder, as pellets and/or as a liquid.

The stack of components comprises a plurality of sections, which differ in their thickness and/or in the type of components arranged within the section. Different types of components may be different types of textile layers, different core elements, components with different materials, components with varying thicknesses and/or of varying heat conductivity or the like. The thickness of a section refers to the height of the stack in the section and hence depends on the number of components arranged in the section and/or on their individual thicknesses.

For activation of the binding agent, the stack of components is heated using a heating means, for instance an oven or a furnace, in which the carrier with the component stack may be arranged. The heating means or heating source may also be a heating blanket placed on top of the stack and/or a heatable mold which heats the carrier on which the component stack is arranged. Also, a combination of any of the aforementioned heating means or heating source is possible.

During the heating, at least one heat input reduction means or heat input reduction is used to reduce the heat input in the binding agent in at least one of the sections of the stack. The reduction of the heat input in the stack may reduce the temperature and/or the temperature gradient in the section of the stack, so that the migration of the binding agent can be reduced. In particular, the heat input reduction means or heat input reduction slows down the heating-up of the respective section, so that a different course of the temperature and/or of the temperature gradient over the cycle time can be obtained. It is in particular possible that by the heat input reduction means or heat input reduction, a relatively even temperature distribution across the preform throughout the entire heating process is achieved so that all areas experience equal or approximately equal temperatures and duration of heating.

The binding agent migration may be driven by diffusion into the components, in particular in the textile components. The binding agent migration may also include a diffusion and/or a flow along the contacting surfaces between adjacently arranged components. The sections of the segment may differ in height of the stack, for instance due to different component thicknesses and/or due to different numbers of stacked components.

The carrier surface, on which the components are arranged, may be a flat surface or a curved surface, for instance a convex or concave surface. This allows for providing a mold shape for the preform building element, so that also curved preform building elements may be fabricated.

By the heat input reduction means or heat input reduction, the heat input in different sections of the stack of components may be adjusted, depending on the structure of the stack and/or depending on the preform building element to be fabricated. In particular, the heat input reduction means or heat input reduction is used to reduce the total heat energy being transferred into the key areas, or the sections of the stack in which the largest binding agent migration may occur. The adhesion between preform components, or layers, respectively can be maximized by preventing excessive binder migration away from the surface of the textile due to overheating of thin regions. In addition, the corresponding cycle times for the preform building element manufacture can be minimized by allowing for higher peak heat energy inputs in thick regions of the preform building element to be manufactured.

The heating means or heat source may have more or less a uniform heat input onto the entire stack, wherein the different heat input into the sections of the stack are adjusted by the heat input reduction means or heat input reduction. This allows for the usage of comparatively simply heating means or heat source, like ovens or furnaces, which are not adapted for adjusting local heat input into the stack of components. In particular, the usage of a plurality of individually controllable heating means or heat source for heating different sections can be avoided. This has the further advantage that the heating means or heat source may be used for a wide verity of different manufacturing processes.

Furthermore, the heating means or heat source may have a comparatively simple structure, so that the costs for the heating means or heat source may be reduced. This enables to use a plurality of heating means or heat source in parallel and hence to fabricate also a plurality of preform building elements in parallel, reducing the process time in the fabrication of the rotor blade. Furthermore, the ability to reduce the heat input in different sections of the stack of components reduces the limitation and the constraints in the design of the component stack, or of the preform building element to be fabricated, respectively. Consequently, less compromises have to be made in the design of the preform building elements and/or regarding the efficiency of the manufacturing process.

The method enables to use a binding agent for locally attaching the components also for manufacture of preform elements with varying thicknesses and/or an uneven composition of components. This allows for making use of the advantages of the binding agent in these manufacturing processes, in particular with regard to the good scalability and the comparatively low time for application. Less scalable and more time-consuming attachment methods like stitching, tufting, braiding, weaving, ultrasonic welding and the like may be omitted.

In some embodiments, after activation of the binding agent, a cooling of the components may occur. Therefore, the heat input of the heating means or heating source may be switched off. In addition, or alternatively, the carrier may be removed from the heating means or heating source or vice versa. It is also possible that a cooling means is used and/or that the carrier is placed in a cooling means for providing an active cooling reducing the time until the component stack is consolidated and a preform building element is manufactured and ready for further transport and/or processing.

In an embodiment, the components are arranged underneath a vacuum foil or enclosed in a vacuum bag. The vacuum may be established in particular prior to the heating, in particular prior to an arrangement of the carrier in a heating means or heating source like an oven. By providing a vacuum, the relative positions of the components in the stack may be fixated so that the fabrication of a preform building element with the desired geometry and/or structure is facilitated. Furthermore, damages and/or misalignment between the component due to a transport of the carrier or the like may be prevented.

In an embodiment, the heat input reduction means or heat input reduction is used to reduce the heat input in an edge area of the component stack. In particular in the edge areas of the component stack, sections with a reduced height of the stack may be present. For example, these sections may be used for providing tapered edge areas of the preform building element to be manufactured, wherein the tapered edge areas may be used afterwards as scarf joints for connecting adjacently arranged preform building elements during the manufacture of the rotor blade.

In addition, or as an alternative to the edge areas, also center areas of the preform building element may have different thicknesses and/or different types of components. This may be the case for instance in sections, in which solid or rigid core components are arranged and which differ therefore from neighboring sections comprising only textile layers as components. In particular rigid core components may have a different heat conductivity and/or different requirements regarding the adhesion of the activated binding agent than textile components like fiber mats or layers.

In an embodiment, at least one heat shield is used as heat input reduction means or heat input reduction, wherein the heat shield is arranged on and/or above of at least one of the sections of the component stack. In particular, the heat shield is arranged in such manner that at least a section of the overlapping components, into which the heat input shall be reduced, is arranged between a surface of the carrier and the heat shield.

In an embodiment, at least one cover element, at least one reflective foil and/or at least one foam layer is used as heat shield, wherein at least one of the sections of the component stack is embedded between the carrier surface and the heat shield. The cover element may comprise a high thermal resistivity and/or a high heat capacity so that the cover element directly arranged on the section, into which the heat input shall be reduced, reduces the temperature and/or the temperature gradient in the covered section. The cover element may be arranged directly on the section, into which the heat input is to be reduced. The cover element may also be reflective, or it may comprise at least one reflecting surface, respectively, so that at least of a part of the heat may be reflected from the cover element and therefore does not heat up the cover element and/or the covered section of the component stack. When a vacuum bag or vacuum foil is used, it is possible that the cover element is arranged inside or outside the vacuum bag, or on top of or underneath the vacuum foil, respectively.

Using an insulating material with a low thermal conductivity as cover element and/or as foam layer, results in a reduction of the heat energy which is transferred to the covered section of the preform element. This also increases the time which is required to reach the thermal equilibrium and therefore the heat input in the binder arranged in the covered section may be efficiently reduced. It is possible that all edge barriers, or all peripheral areas, respectively of the component stack are covered by cover elements, hence that one or more cover elements are arranged on the entire outer circumference of the component stack. The cover elements may be provided as separate parts, which can be placed on the one or more sections of the component stack using handles or the like.

It is also possible that as cover elements, further components of the same type of components which are used for fabricating the preform building element are used. These extra components are not adhered with a binder and removed after consolidation of the binder. The additional material may not be thermal insulating, but it may comprise a high specific heat capacity to store a lot of thermal energy, so that they heat up slowly. This again protects the covered section of the preform building element located underneath the cover element from being overheated, as the section will experience a lower temperature and thereby the binding agent in this section will not melt away. For instance, cover elements of balsawood may be used.

In addition, or alternatively, a reflective foil may be used as heat shield. A reflective foil can be used to reduce heat transfer into desired sections through reducing radiative heat transfer. For instance, within a typical oven used as heating means or heat source, the heat energy is transferred to the component stack both via the flow of heated air in a convective heat transfer and via radiated heat from the surfaces within the oven and hence as radiative heat transfer. One or more reflective foils can be placed directly on the surface of the stack to reduce the total heat energy being absorbed. The use of a reflective foil or a low emissivity foil, respectively, is effective as it allows for simple, accurate, and flexible shielding of targeted sections from radiated heat. The regions covered can easily be adjusted, allowing for fine turning of the heating process. The reflective foil may be placed on either or both sides of the component stack and optionally placed in a vacuum bag or underneath a vacuum foil. Once the vacuum foil/bag is removed, the foil will likewise be removed.

The heat shield may also be a foam which may be applied for instance by hand or automatically, in particular to the edges of the component stack. The foam may be applied on top of the respective section, in particular outside of a vacuum bag, or on the outer side of a vacuum foil, respectively.

In an embodiment, one or more shielding elements, in particular shielding panels and/or shielding curtains, are used as heat shield, wherein the shielding elements are arranged in a distance above at least one of the sections of the component stack. The shielding elements may be arranged above sections that require less heat energy to reach the target temperature. The purpose of the shielding elements is to reduce the heat transfer via convective and radiative heat transfer. The shielding elements may be arranged parallel or under an angle to the edge of the carrier, or the surface of the carrier, respectively.

By the shielding elements, one or more sections of the component stack are shadowed at least partly from heat which is transferred to the component stack from above. The shielding elements may have the form of shielding panels or shielding flaps. Also, the usage of shielding curtains is possible. The shielding elements may be attached to the heating means or heat source, for instance to the inner wall of an oven, which is used as heating means or heat source. In particular, the position of the shielding elements may be adjustable so that the area of coverage can be varied between different preform building elements to be fabricated.

In an embodiment, a heating means or heat source providing a hot airflow streaming above the components is used as the heating means or heat source and at least one air flow separation means or air flow separator is used as the heat input reduction means or heat input reduction, wherein the air flow separation means or air flow separator separates at least a part of the volume above the component stack for locally reducing the air flow speed above at least one of the sections of the component stack.

The air flow separation means or air flow separator may be used to physically divide the sections, in which the heat input should be reduced, from the other sections of the component stack. By the air flow separation means or air flow separator, the volume above the component stack is separated in a plurality of horizontally adjacent sub-volumes. This reduces the flow speed of hot air, which is blown above the component stack in the divided volume. The reduced flow speed of the air causes also a reduced heat transfer to the surface of the stack so that also the heat input in one or more sections may be reduced. Consequently, the air flow separation means or air flow separator compartmentalizes the volume above the stack for creation of isolated heating zones of the component stack.

In an embodiment, a plate-like separation element arranged above the components and/or an air curtain arrangement providing at least one air stream towards at least one of the sections of the component stack, in particular to an edge of the section, is used as air flow separation means or air flow separator.

One or more plate-like separation elements may be used as protective curtain shields, which may be arranged for instance perpendicular or at an angle to the surface of the carrier, or to the component stack, respectively. For instance, the convection coefficient from the air into the section of the component stack may be significantly reduced by producing a laminar air flow by the plate-like separation elements, wherein the laminar air flow significantly reduces the heat input compared to a turbulent air flow in these sections. Due to the reduced heat transfer into at least one of the sections of the component stack, the sections heat up slower and experience therefore a lower temperature so that the binding agent migration in these sections can be reduced. The plate-like separation elements therefore reduce the heat transfer in the sections and not the temperature of the section, which will be the same in all portions of the stack when only plate-like separation elements are used.

In addition, or alternatively, an air curtain arrangement may be used as the heat input reduction means or heat input reduction, wherein the air curtain arrangement provides an air stream towards at least one of the sections of the preform stack, in particular towards an edge of the section. The air stream works as an air curtain. Therefore, the air curtain arrangement may be used to create separate heating zones within a heating means or heat source like an oven. The at least one air stream, which forms the air curtain, may be created by a plurality of jets, through which air is blown to create a curtain that divides the volume above the component stack into different sub-volumes above different sections of the stack that require different levels of heat energy.

By such an air curtain, for instance the speed of hot air circulating within each region may be adjusted to change the heat transfer coefficient from the hot air to the preform. By having high levels of air flow over thick areas of the preform and low levels of air flow over thinner regions of the preform, a relatively uniform heating may be achieved.

Air curtains allow for more flexibility in the creation of separate heating zones than physical dividers like the plate-like separation elements. For instance, an air curtain can be easily repositioned to adjust the size of heating zones through changing the angle of the air jet. Furthermore, air curtains work at variable distances and hence do not require modification as physical dividers do when dimensions of components and/or preform building elements change. This facilitates the manufacture of different types of preform building elements using the same setup.

In an embodiment, a cooling arrangement is used as the heat input reduction means or heat input reduction, wherein the cooling arrangement is arranged above at least one of the sections of the component stack, underneath at least one of the sections of the component stack, and/or in the vicinity of the carrier surface. The cooling arrangement may provide an active cooling to prevent a rapid heating of thinner sections of the preform stack, for instance within an oven used as heating means or heat source. The cooling means removes heat from at least one of the sections and therefore reduces the net heat input into the sections.

The cooling arrangement may comprise one or more cooling ducts, which may be arranged on at least one of the sections of the component stack and/or underneath of the carrier, in particular opposite to the at least one section to which the heat input shall be reduced. In addition, or alternatively, the cooling arrangement may comprise one or more openings in a housing of the heating means or heat source, which may be for instance open to remove heat from the edge regions of the preform component stack. In addition, or alternatively, the cooling arrangement may have one or more fans which allow to vent cooler air over the sections of the component stack to either reduce the rate at which the heat or to cool regions which have already achieved the target heating temperature for the required duration of time.

In particular, the cooling arrangement may be used to cool at least one section of the component stack once a target heat input and/or a target heating temperature of the section has been reached to prevent this section from overheating. Therefore, a control unit may be provided, which activates the cooling arrangement, for instance by providing a cooling flow through a cooling duct, by opening one or more of the openings in the housing and/or by activating and/or adjusting an air flow and/or an air temperature of a cool air provided by a cooling the cooling arrangement. The cooled section of the component stack may be considered to have a shorter heating cycle time than an uncooled section, effectively reducing the heat input in the binding agent in these sections.

In particular, the cooling arrangement may be used with further heat input reduction means or heat input reduction. In particular the cooling arrangement may be used in a setup in which compartmentalized and isolated heating zones, for instance by using the separation elements, the air curtain and/or the shielding elements, are used.

It is possible that a cooling duct, which may be used for cooling a section of the component stack, is also used as a heating means or heat source by providing a hot fluid flow to the cooling duct. This allows for controlled heating in the areas in the vicinity of the cooling duct, for instance in the adjacent portion of the carrier surface. This increases the flexibility of the production setups since also preform building elements with thicker edges and hence an increase requirement for heat exposure may be manufactured.

An oven according to embodiments of the invention is adapted to heat preform building material arranged on at least one carrier surface for producing preform building elements used for building a rotor blade of a wind turbine and comprises a housing with an interior adapted to receive at least one carrier with a plurality of components arranged on a surface of a carrier in a receiving volume in the interior, wherein the oven comprises a heating means or heat source for heating the interior and at least one heat input reduction means or heat input reduction for locally reducing the heat input of the heating means or heat source in a section of the receiving volume.

In an embodiment, the heat input reduction means or heat input reduction is a heat shield comprising one or more shielding elements, in particular shielding panels and/or shielding curtains, wherein the shielding elements are arranged directly adjacent to the receiving volume and/or in a distance above the receiving volume.

In an embodiment, the shielding elements are pivotably and/or slidably attached to the housing. The shielding elements may be relocated and/or adjusted by pivoting and/or sliding, so that the oven may be adapted to different manufacturing processes for different preform building elements. In particular, the shielding elements are removably attached to the oven, so that they also may be removed from the interior of the oven if they are not needed in a certain production process.

In an embodiment, the heating means or heat source is adapted to provide a hot air flow streaming through an air stream volume above the receiving volume, wherein the heat input reduction means or heat input reduction comprises at least one air flow separation means or air flow separator, wherein the air flow separation means or air flow separator is adapted to locally reduce the air flow speed at least above a section of the receiving volume.

In an embodiment, the air flow separation means or air flow separator is a plate-like separation element arranged above the components and/or an air curtain arrangement with a plurality of jets, wherein at least one air stream directed to a section of the receiving volume is generatable through the jets. The jets of the air curtain arrangement may be adjustable for adjusting the direction of the generated air stream.

In an embodiment, the oven comprises a cooling arrangement, wherein the cooling arrangement is arranged above at least one section of the receiving volume, underneath at least one section of the receiving volume, and/or in a wall of the housing.

The cooling arrangement may comprise one or more cooling ducts, one or more air providing means and/or one or more openings in the wall of the housing.

All details and advantages described in relation to the method according to embodiments of the invention apply correspondingly to the oven according to embodiments of the invention and vice versa.

BRIEF DESCRIPTION

Some of the embodiments will be described in detail, with reference to the following figures, wherein like designations denote like members, wherein:

FIG. 8 shows a reflective foil used as a heat shield on the component stack;

DETAILED DESCRIPTION

Figure 1:
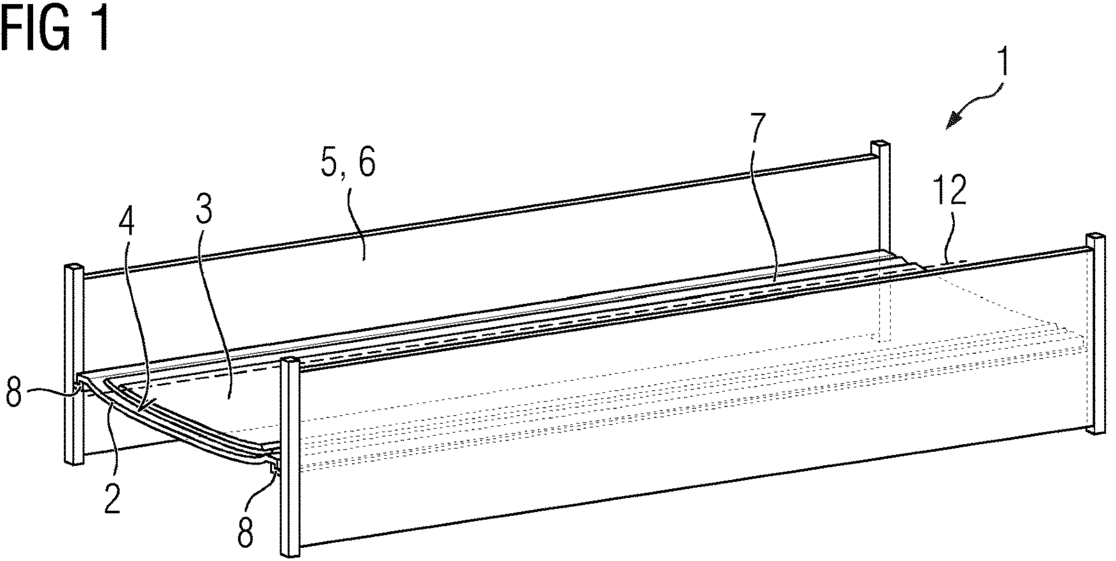
FIG. 1 shows components for manufacturing a preform building element arranged on a carrier.

In FIG. 1, an arrangement 1 used in a method for manufacturing a preform building element is shown. The arrangement 1 comprises a carrier 2, on which a plurality of components is arranged at least partly overlapping the in a component stack 3 on a surface 4 of the carrier 2. The carrier 2 with the component stack 3 is arranged into an oven 5, from which a section of a housing 6 is depicted schematically. Prior to the arrangement in the oven 5, the carrier 2 may be arranged outside the oven, for instance to allow for the arrangement of the components on the surface 4.

The carrier 2 comprises a concave top surface 4, on which the component stack 3 is arranged. The carrier 2 may be slid into the housing 6 of the oven 5 for instance using a pair of rails 8. The top surface 4 of the carrier 2 may also be flat, convex or of any other shape required for forming a preform building element to be fabricated from the component stack 3.

Figure 2:
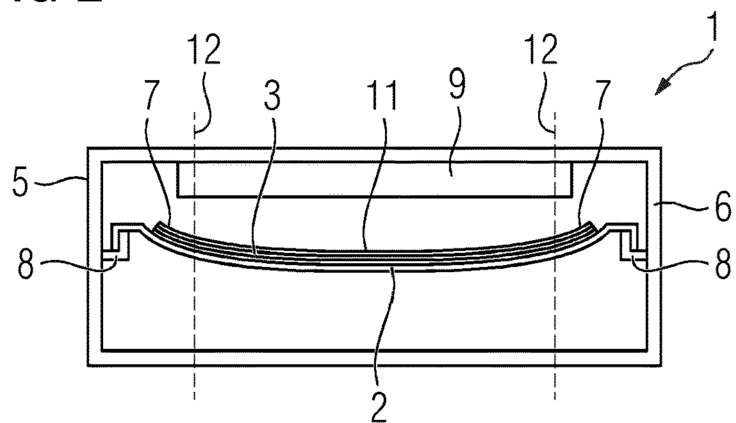
FIG. 2 shows the carrier arranged inside an oven.

In FIG. 2, a view on a face side of the oven 5 is shown. Inside the housing 6, the carrier 2 with the component stack 3 is arranged. The component stack 3 comprises a plurality of components, which are arranged at least partly overlappingly on the surface 4 of the carrier 2. The stack 3 comprises a plurality of sections with overlapping components between which a binding agent is arranged. For activation of this binding agent, the oven 5 is used as a heating means or heat source for heating the component stack 3. Therefore, the oven 5 may comprise one or more heating arrangements 9.

Figure 3:
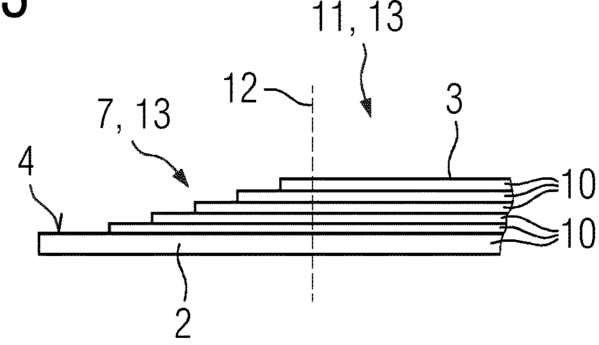
FIG. 3 shows an edge region of a component stack.

In FIG. 3, a detailed view of an edge area of the stack 3 is shown. The stack 3 comprises a plurality of textile components 10, which are arranged in such manner that they are at least partly overlapping. The textile components 10 may be layers of a fiber material like glass fibers, carbon fibers and/or aramid fibers. In between the components 10, the binding agent is distributed. The binding agent may be for instance a powder binder comprising a thermoplastic of thermoset material, which is used for locally adhering the textile components 10 together.

The binding agent is heated, or activated, respectively, using the oven 5 so that the binding agent migrates locally into the textile components 10. After the migration, when the binding agent is cooled for hardening again, the components 10 of the stack 3 are locally adhered to each other. The stack of components 3 then forms a preform building element which may be used for building a rotor blade of a wind turbine. In addition, or alternatively to at least some of the textile components 10, also rigid core components may be used as components for fabricating the preform building element. Also, rigid core components, like panels of balsawood or the like, are adhered to adjacent components using the binding agent.

As can be seen from FIG. 3, the edge area 7 of the stack 3 comprises a different thickness than a center area 11. The borderline between the edge area 7 and the center area 11 is schematically indicated by the dashed line 12. Due to the reduced thickness in the edge area 7, the edge area 7 is a section 13 of the component stack 3 which comprises a lower thickness than the center area 11.

Additionally, or alternatively two sections 13 with different thicknesses, the stack 3 of the components 10 may also comprise sections 13 with different types of components 10, in particular sections with rigid core components and sections without rigid core components. These sections 13 may not necessarily be at the edge area 7 of the component stack 3 but may also be present within the middle section 11.

Sections 13 with different thicknesses and/or different types of components may require different heat input to avoid excessive binding agent migration during the heating of the component stack 3. Therefore, in a method for manufacturing of a preform building element according to embodiments of the invention, at least one heat input reduction means or heat input reduction 14 is used to reduce the heat input in the binding agent in at least one of the sections 13 of the stack 3 for reducing binding agent migration during the activation of the binding agent.

Figure 4:
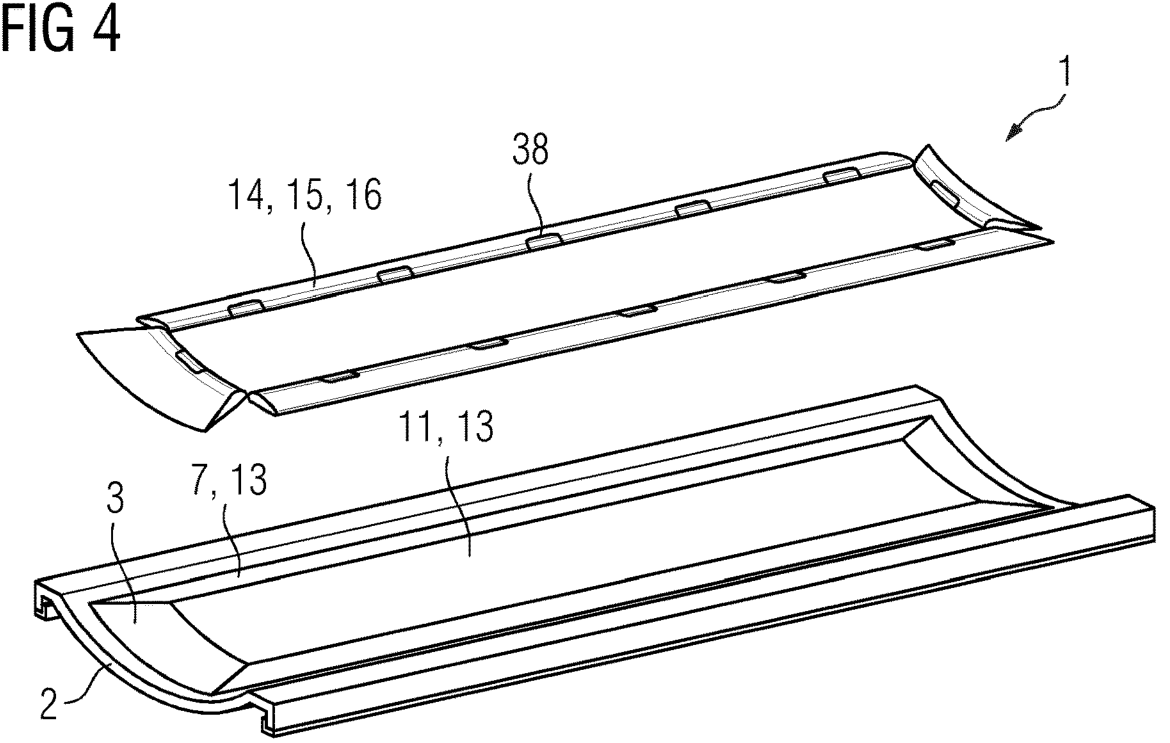
FIG. 4 shows a first embodiment of cover elements used as a heat shield and arranged on the component stack in an embodiment of a method.

In FIG. 4, a first embodiment of the method is shown. In this embodiment, cover elements 15 are used as heat reducing means 14. The cover elements 15 serve as a heat shield 16 and are arranged on the edge area 7 of the stack 3 to cover the edge area 7 of the stack 3. In particular, the entire edge area 7 of the component stack 3 along the circumference of the stack 3 is covered. The center area 11, in which the stack 3 comprises for instance a larger thickness than in the edge area 7, remains uncovered since no cover elements 15 are arranged. The edge area 7 is embedded in between the carrier surface 4 and the cover elements 15.

Each of the cover elements 15 comprises a tilted shape. The cover elements 15 may be an insulating material like expanded polystyrene or the like. The cover elements 15 are therefore thermally insulating and have a low thermal conductivity. This results in a reduction in the heat energy which is transferred to the edge area 7 of the component stack 3. The cover elements 15 may each comprise one or more handles 38 for facilitating their arrangement. The components 10 of the component stack 3 may be arranged underneath a vacuum foil 17 or in other words, the components 10 of the component stack 3 may be covered by a vacuum foil 17. Alternatively, the components 10 may be enclosed in a vacuum bag. The cover elements 15 may be arranged on top of the vacuum foil 17, or the vacuum bag, respectively, so that they do not affect the arrangement of the components and/or the application of the vacuum underneath the vacuum foil 17, or in the vacuum bag, respectively.

Figure 5:
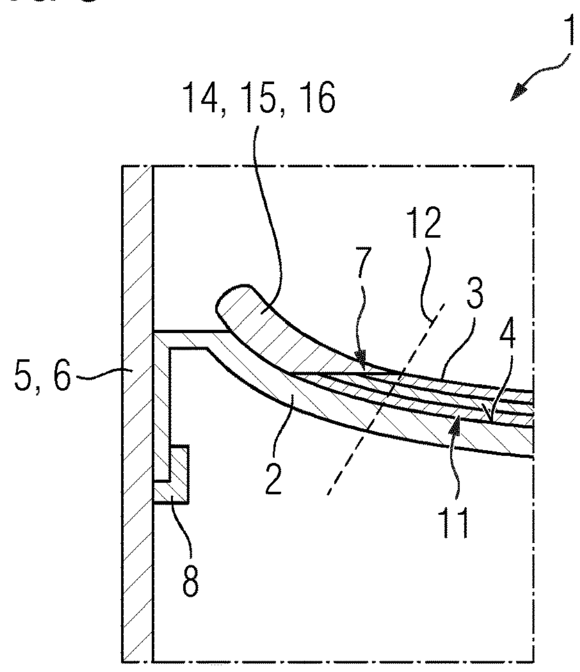
FIG. 5 shows a side view of the cover elements.

In FIG. 5, a cut view of a section of the arrangement depicted in FIG. 4 is shown. The cover elements 15 are used to cover a section 13 of the stack 3, namely the edge area 7. By using the cover elements 15, the heat input from a heating means or heat source, for instance from the heating arrangement 9 of the oven 5 as depicted in FIG. 2, into the edge area 7 is reduced.

Correspondingly, the time which is required to reach the thermal equilibrium, is increased. By providing the cover elements 15 as a heat shield 16, a more even temperature distribution across the component stack 3 through the entire heating process may be obtained. All areas, or sections 13, respectively, of the component stack 3 experience equal or approximately equal temperatures, for instance within an interval of 10 K around a target temperature, and duration of the heating.

Figure 6:
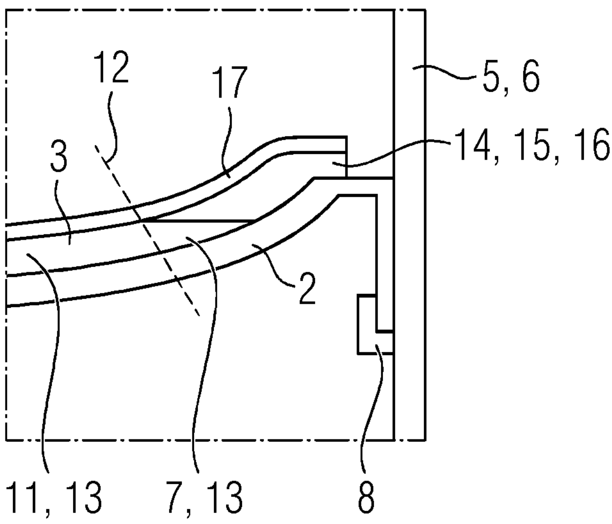
FIG. 6 shows a second embodiment of cover elements used as a heat shield.

As it is depicted in FIG. 6, it is also possible that the cover elements 15 are placed underneath the vacuum foil 17, or inside the vacuum bag, respectively. As an alternative to a thermally insulating material, also a material with a high specific heat capacity, which is able to store a lot of thermal energy, may be used for the cover elements 15.

The cover elements 15 may for instance consist of balsawood as it would normally be used in the manufacture of the preform building elements, or of the rotor blade of the wind turbine, respectively. By providing cover element 15 consisting of or comprising a material with a high heat capacity, the edge area 7 or another section 13 of the stack 3 may be protected from the heat input from a heating means or heat source like the oven 5. The section 13 underneath the cover element 15 heats up to a lower temperature compared to the center area 11, which remains uncovered, so that the binder migration in the covered section 13 is reduced. The effect is equal to the addition of the cover elements 15 comprising from a thermally insulating material, but the underlined physical phenomena is different for a material comprising a higher specific heat capacity.

Figure 7:
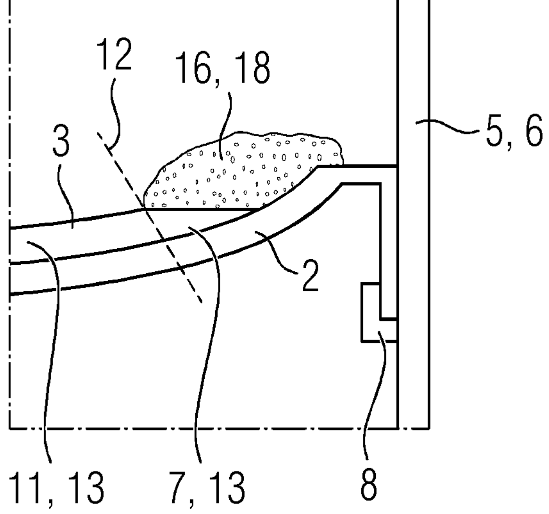
FIG. 7 shows a foam used as heat shield on the component stack.

In FIG. 7, a further embodiment of a heat shield 16 used as a heat input reduction means or heat input reduction 14 is shown. In this embodiment, a foam layer 18 is used as a heat shield 16, wherein the foam layer 18 is applied to the edge area 7 of the component stack 3. The foam layer may be applied prior to the heating either manually or automatically by a foam distribution means on one or more sections 13 of the component stack 3.

In FIG. 8, a further embodiment of a heat shield 16 used as a heat input reduction means or heat input reduction 14 is shown. In this embodiment, a reflective foil 19 is used as heat shield 16. The reflective foil 19 is arranged underneath the vacuum foil 17, which is at least partly transparent. The reflective foil 19 may be for instance aluminium foil, which allows for simple, accurate and flexible shielding of one or more sections 13 of the stack 3.

Figure 9:
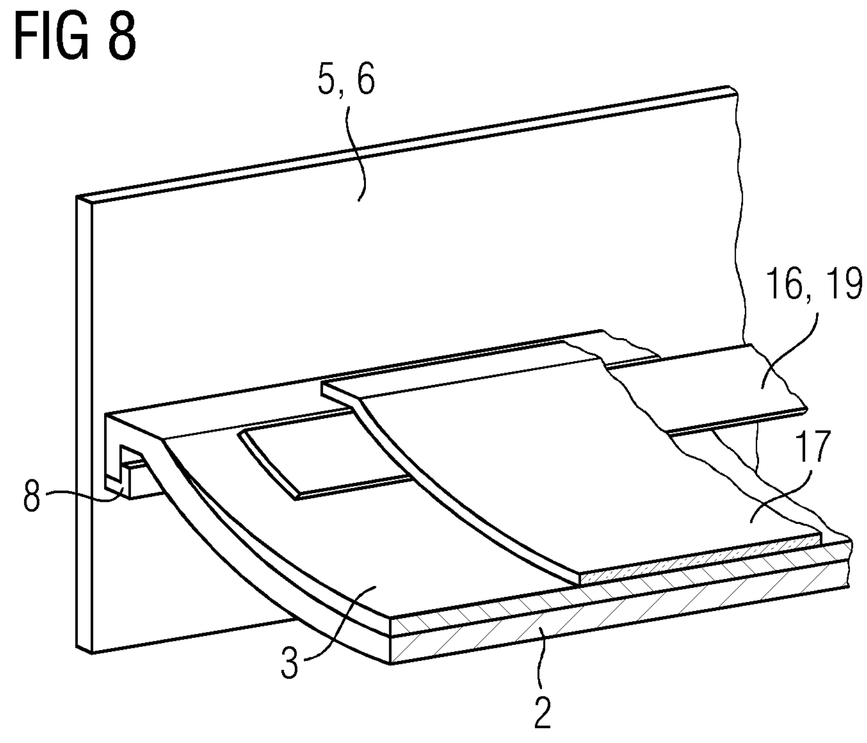
FIG. 9 shows a cut view of the reflective foil.

As is schematically depicted in FIG. 9, the heat, indicated by the arrows 20, is partly reflected from the reflective foil 19 in the edge area 7 of the component stack 3. Therefore, the reflective foil 19 reduces the heat input into the edge area 7 and therefore reduces the binding agent migration in the edge area 7.

In a typical oven 5, the heat energy is transferred to the preform stack 3 both as a flow of heated air, or in a convective heat transfer, respectively, and as radiated heat from the surfaces of the housing 6 of the oven and/or from the heating device 9 in a radiative heat transfer. The reflective foil 19 may have a low emissivity to reduce the local heat energy being absorbed in the edge area 7. The reflective foil 19 may be placed for instance underneath the vacuum foil 17 or on top of the vacuum foil 17.

The at least one section 13, which is covered by the reflective foil 19, may be easily adjusted allowing for fine tuning of the heating process. It is also possible that the flexible foil 19, or an additional flexible foil 19, respectively, is placed underneath the edge area 7 of the stack 3, and hence in between the stack 3 and the surface 4 of the carrier 2. Also, the further reflective foil 19 may be placed in a vacuum bag or outside of the vacuum bag, respectively.

Figure 10:
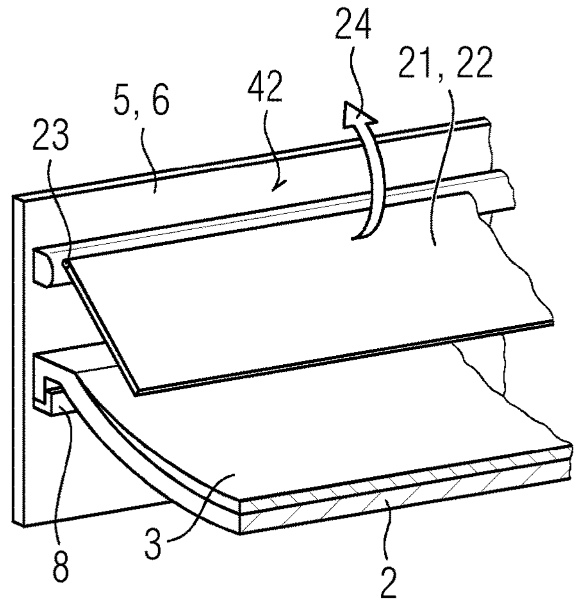
FIG. 10 shows a section of a first embodiment of an oven.
Figure 11:
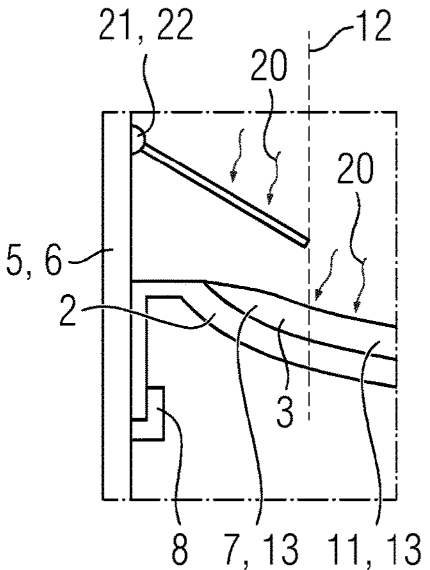
FIG. 11 shows a cut view of the section of FIG. 10.

In FIG. 10, a further embodiment of a method for manufacturing a preform building element is shown. The method uses a first embodiment of an oven 5 according to embodiments of the invention. For reducing the heat input in the edge area 7 of the component stack 3, a heat shield 16 is used as heat input reduction means or heat input reduction 14. In this embodiment, the heat shield 16 is provided as a shielding element 21. As shielding element 21, a shielding panel 22 is used. The shielding panel 22 is arranged in a distance above at least one of the sections 13 of the component stack 3, or the edge area 7 of the component stack 3, respectively. The shielding panel 22 is attached to an inner wall 42 of the housing 6 of the oven 5 by a hinge 23, so that it might be pivoted as indicated by the arrow 24. The shielding element reduces the heat transfer via convective and radiative heat transfer, as schematically indicated by the arrows 20 in FIG. 11. By varying the angle between the shielding panel and the surface 4 of the carrier 2, or the wall 6 of the housing, respectively, the width of the covered area may be adapted to differently large edge areas 7 of different types of preform building elements to be fabricated.

Figure 12:
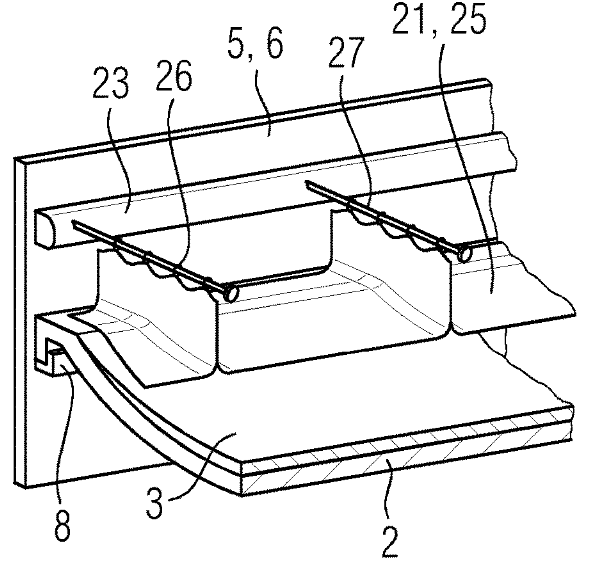
FIG. 12 shows a section of a second embodiment of an oven.

The shielding means 21 may be provided in a wide variety of shapes, for instance as shielding panels or, as it is depicted in FIG. 12, as shielding curtains 25. The shielding curtains 25 are attached to the inner wall of the housing 6 by a slidable coupling using a plurality of rings 26 and a plurality of rods 27, on which the rings 26 are hanging. Also, the rods 27 may be attached to the inner wall of the housing 6 by a hinge 23, so that the rods 27 and the shielding curtains 25 may be pivoted towards the wall, when a further heat protection of the edge area 7 of the component stack 3 is not required.

Figure 13:
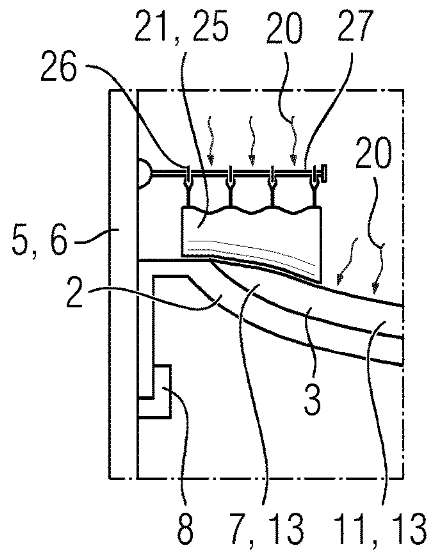
FIG. 13 shows a cut view of the section of FIG. 12.

As can be seen from FIG. 13, the shielding curtains are slidable along the rods 27, so that the portion, which is covered by the shielding curtains 25 may be adjusted to cover differently wide edge areas 7 and/or other sections 13 of the component stack 3. This allows the adaption of the shielding curtains 25 to different preform building elements to be manufactured.

The carrier 2 is arranged inside a receiving volume 39 of the oven, wherein the shielding elements 21, in particular the shielding panels 22 and/or the shielding curtains 25 are arranged directly adjacent to the receiving volume 39 and/or in a distance above the receiving volume. This allows for covering a section 13 of the component stack 3, when the carrier with the corresponding component stack 3 is received in the receiving volume 39 of the oven 5.

Figure 14:
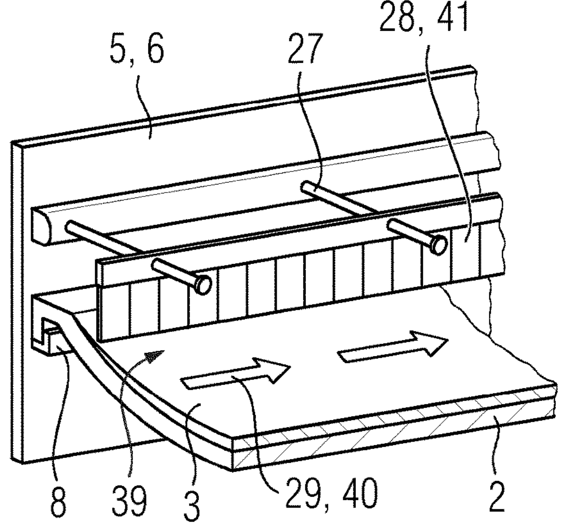
FIG. 14 shows a section of a third embodiment of an oven.
Figure 15:
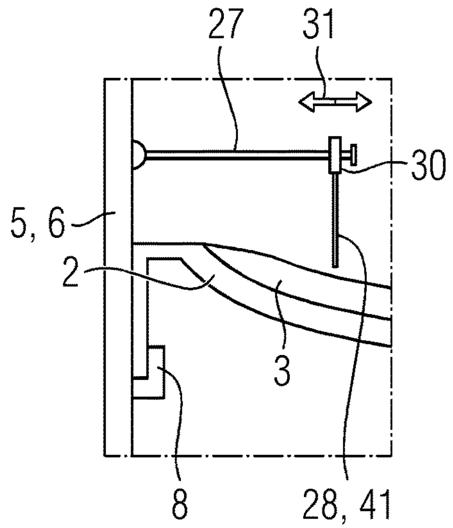
FIG. 15 shows a cut view of the section of FIG. 14.

In FIG. 14, a further embodiment of a method for manufacturing a preform building element for building a rotor blade of a wind turbine using a further embodiment of an oven 5 is depicted. The oven 5 is adapted to provide a hot air flow streaming through an air stream volume 40 above the receiving volume 39, in which the carrier 2 and the component stack 3 are arranged.

As heat input reduction means or heat input reduction 14, a plurality of air flow separation means or air flow separator 41 are used, which are each provided as a plate-like separation element 28. The separation elements 28 are arranged above the receiving volume 39 to horizontally separate at least a part of the air stream volume 40 for locally reducing the air flow speed at least above the section of the receiving volume corresponding to a section 13 of the component stack 3. The hot air may be blown through the interior of the housing 6 of the oven 5 as indicated by the arrows 29. The plate-like separation elements 28 separate the air flow volume 40 above the top surface of the component stack 3.

Dividing the air flow volume 40 into a plurality of sub-volumes in between two adjacently arranged separation elements 28 may cause in particular a laminar air flow instead of a turbulent air flow, in particular in the limited portion of the air flow volume 40 above the edge section 7, which is shielded at each side from the remainder of air flow volume 40 above the middle section 11 by the separation element 28. In regions of laminar air flow, less heat is transferred to the component stack 3 since the convection coefficient from the air onto the preform components of the stack 3 is significantly reduced.

Also, the separation element 28 may be slidably coupled to the housing 6, for instance by providing a plurality of orifices 30 in the separation element 28, which engage in rods 27 protruding from the inner wall of the housing 6. This allows for sliding the separation elements 28 along the rods 27, as it is schematically indicated by the arrow 31.

Figure 16:
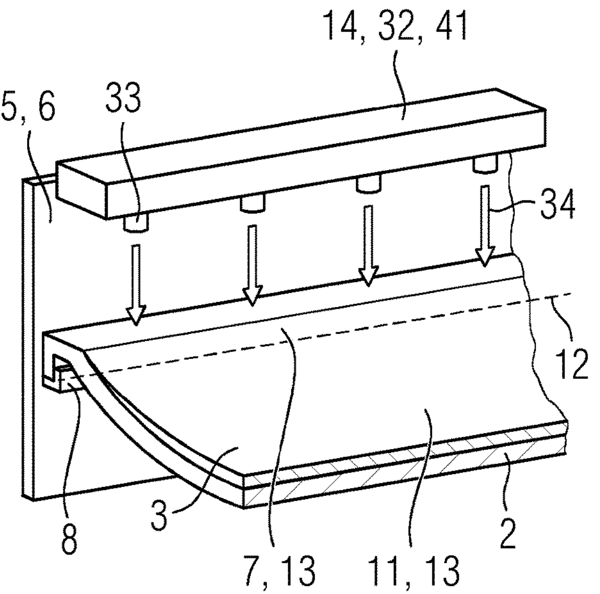
FIG. 16 shows a section of a fifth embodiment of an oven.

In FIG. 16, a further embodiment of a method using a further embodiment of the oven 5 is shown. In this embodiment, the oven 5 comprises an air curtain arrangement 32, wherein the air curtain arrangement 32 comprises a plurality of jets 33. The air curtain arrangement 32 is used as an air flow separation means or air flow separator 41 and therefore as heat input reduction means or heat input reduction 14.

Figure 17:
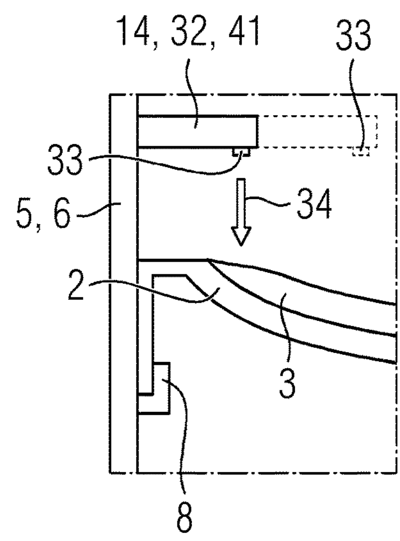
FIG. 17 shows a cut view of a section of the oven according to FIG. 16.

Through the jets 33, at least one air stream directed to a section of the receiving volume is generatable. In this embodiment, the air stream produced by the air curtain arrangement 32 is directed on the edge section 7 of the component stack 3, as schematically indicated by the arrows 34. It is also possible that the air curtain arrangement 32 comprises further jets 33, which are directed for instance on the middle part 11 or on further sections 13 of the component stack 3, as schematically indicated in dashed lines in FIG. 17 showing the cut view corresponding to FIG. 16.

Through the jets 33, air can be blown to create curtains within the oven that divide the sections 13 of the component stack 3 that require different levels of heat energy. Therefore, the air can be blown in particular on the edge of a section 13 and/or on the boundary between two adjacent sections 13. The speed of air circulating above each section 13 of the stack 3 can be adjusted to change the heat transfer coefficient from the hot air created from the oven 5 to the component stack 3. By having high levels of air flow over thick areas of the component stack 3 and low levels of air flow over thinner sections 13 of the component stack 3, a relatively uniform heating of the stack 3 can be achieved. The jets 33 may be adjustable to adjust the direction of the air flow, or the position of the air curtains created by the air curtain arrangement 32, respectively. This allows for adapting the oven 5 for the manufacture different types of preform building elements.

Figure 18:
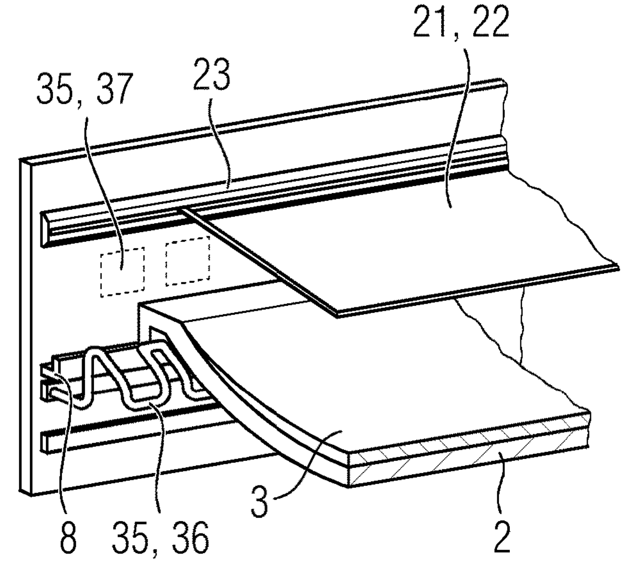
FIG. 18 shows a section of a sixth embodiment of an oven.

In FIG. 18, a further embodiment of a method using a further embodiment of an oven 5 is shown. In this embodiment, the oven comprises a cooling arrangement 35, which is provided as a cooling duct 36. The cooling arrangement 35 is arranged underneath the carrier 2, in particular so that the cooling duct is in direct contact with the lower surface of the carrier 2. The cooling arrangement 35, or the meandering cooling duct, respectively, is abutting the lower side of the carrier 2 adjacently to the edge area 7 of the stack 3. The cooling arrangement 35 may be used to cool the edge area 7 to reduce the net heat input into the edge area 7, since further heat is removed from the edge area 7 due to the cooling arrangement 35.

In addition, the cooling arrangement 35 may comprise openings 37 in the housing 6 of the oven 5. The openings 37 may be opened for instance automatically, when the edge area 7 of the component stack 3 has been exposed to a sufficient temperature for a sufficient duration, or to a sufficient heat input, respectively. By opening a cover of the openings 37, the temperature in the edge area of the component stack 3 can be reduced. Additionally, or alternatively, the cooling arrangement 35 may comprise fans or jets, which allow for directing an air stream of cool air on the edge area 7, or on other sections 13 of the component stack 3, respectively.

The cooling duct 37 may also be used for providing a heated liquid to the edge area 7, or through other sections 13 of the stack 3, respectively, during the manufacture of the preform elements. This allows for adapting the manufacturing process also for the fabrication of preform building elements, which for instance comprise thicker edge regions and/or edge regions with different types of components in the stack 3.

The cooling arrangement 35 may be used to cool at least one section 13 of the component stack 3 once a target heat input and/or a target heating temperature of the section 13 has been reached to prevent this section from overheating. Therefore, a control unit (not depicted) may be provided, which activates the cooling arrangement 35, for instance by providing a cooling flow through the cooling duct 36, by opening one or more of the openings 37 in the housing and/or by activating and/or adjusting an air flow and/or an air temperature of a cool air stream provided by a cooling the cooling arrangement 35. The cooled section 13 of the component stack 3 may be considered to have a shorter heating cycle time than an uncooled section 13, effectively reducing the heat input in the binding agent in the cooled section 13.

Figure 19:
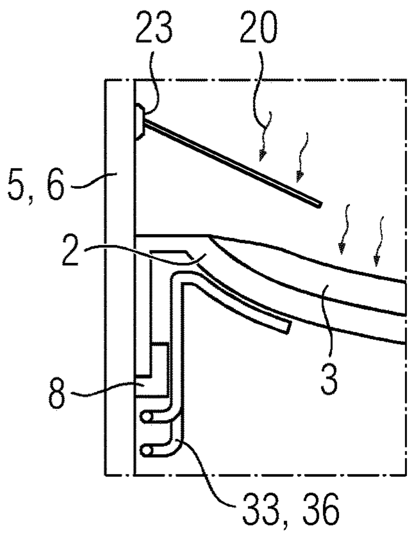
FIG. 19 shows a cut view of a section of the oven according to FIG. 18.

As can be seen from FIG. 19, the cooling means 37 may be combined with other types of heat input reduction means or heat input reduction. Exemplarily, a shielding element 21 provided as a shielding panel 22 is shown. The cooling through the cooling arrangement 35 is more efficient when it is combined with other means for reducing the heat input in the edge area 7, since the amount of heat, which has to be removed using the cooling arrangement 35, is reduced, when the heat is partly shielded or not transferred to the component stack 3, respectively.

It is possible that in the method for manufacturing a preform building element, more than one embodiment of a heat input reduction means or heat input reduction 14 is used. The aforementioned embodiments of heat input reduction means or heat input reduction 14 may be used in any combination.

Also, an oven 5 according to embodiments of the invention may comprise different embodiments of a heat input reduction means or heat input reduction 14. An oven 5 may comprise one pair of rails 8 or a plurality of pairs of rails 8, so that more than one carrier 2 may be inserted in the oven 5 at the same time. In this case, the heat input reduction means or heat input reduction 14 may be provided adjacently to each inserted carrier 2, or to each receiving volume 39, respectively, in particular when the oven 5 heats the component stack 3 using hot air as previously described.

Although the present invention has been disclosed in the form of embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements.

The invention claimed is:

1. A method for manufacturing a preform building element used for building a rotor blade of a wind turbine including, arranging a plurality of components at least partly overlappingly in a component stack on a surface of a carrier, wherein the component stack comprises a plurality of sections with overlapping components between which a binding agent is arranged, wherein the sections of the stack comprise at least partly a different thickness and/or different types of components, heating the component stack using a heating source for activating the binding agent, wherein during the heating, at least one heat input reduction is used to reduce the heat input in the binding agent in at least one of the sections of the component stack for reducing binding agent migration during the activation, wherein a heating source providing a hot airflow streaming above the components is used as the heating source and at least one air flow separator is used as the heat input reduction, wherein the air flow separator separates at least a part of the volume above the component stack for locally reducing the air flow speed above at least one of the sections of the component stack, and wherein a separation element arranged above the components is used as the air flow separator.

2. The method according to claim 1, wherein the components are arranged underneath a vacuum foil or enclosed in a vacuum bag.

3. The method according to claim 1, wherein the heat input reduction is used to reduce the heat input in an edge area of the component stack.

4. The method according to claim 1, wherein a cooling arrangement is used as an additional heat input reduction, wherein the cooling arrangement is arranged above at least one of the sections of the component stack, underneath at least one of the sections of the component stack, and/or in the vicinity of the carrier surface.

5. A method for manufacturing a preform building element used for building a rotor blade of a wind turbine comprising:

arranging a plurality of components at least partly overlappingly in a component stack on a surface of a carrier, wherein the component stack comprises a plurality of sections with overlapping components between which a binding agent is arranged, wherein the sections of the stack comprise at least partly a different thickness and/or different types of components; and heating the component stack using a heating source for activating the binding agent, wherein during the heating, at least one heat input reduction is used to reduce the heat input in the binding agent in at least one of the sections of the component stack for reducing binding agent migration during the activation;

wherein a heating source providing a hot airflow streaming above the components is used as the heating source and at least one air flow separator is used as the heat input reduction, wherein the air flow separator separates at least a part of the volume above the component stack for locally reducing the air flow speed above at least one of the sections of the component stack, and wherein an air curtain arrangement providing at least one air stream towards at least one of the sections of the component stack, to an edge of the section, is used as the air flow separator.

* * * * *